(12) United States Patent
Carbone et al.

(10) Patent No.: US 8,820,174 B2
(45) Date of Patent: Sep. 2, 2014

(54) DUAL THRESHOLD SENSOR FOR DETECTING RELATIVE MOVEMENT

(71) Applicant: Hamilton Sundstrand Corporation, Windsor Locks, CT (US)

(72) Inventors: Michael Carbone, Rockford, IL (US); Martha L. Fisher-Votava, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 76 days.

(21) Appl. No.: 13/683,512

(22) Filed: Nov. 21, 2012

(65) Prior Publication Data

US 2014/0137659 A1    May 22, 2014

(51) Int. Cl.
*G01L 1/00*     (2006.01)
(52) U.S. Cl.
CPC .......................................... *G01L 1/00* (2013.01)
USPC ............................................... 73/783; 73/855
(58) Field of Classification Search
USPC ......................... 73/783, 855; 340/687, 686.1
See application file for complete search history.

(56) References Cited

U.S. PATENT DOCUMENTS

| 6,007,267 | A  | * | 12/1999 | VanHorn ........................... 403/2 |
| 6,483,436 | B1 | * | 11/2002 | Emaci et al. ............... 340/686.1 |
| 7,197,870 | B2 |   | 4/2007  | Bannon |
| 7,375,645 | B2 |   | 5/2008  | Tsai |
| 7,921,729 | B2 |   | 4/2011  | Conner et al. |
| 8,104,736 | B2 |   | 1/2012  | Callaghan |
| 8,118,562 | B2 |   | 2/2012  | Raes et al. |
| 8,269,596 | B2 |   | 9/2012  | Staylor |
| 8,516,898 | B2 | * | 8/2013  | Mayer et al. .................... 73/783 |
| 2002/0171556 | A1 |   | 11/2002 | Emaci et al. |
| 2006/0229055 | A1 |   | 10/2006 | Tsai |
| 2007/0080261 | A1 |   | 4/2007  | Neumann et al. |
| 2007/0145180 | A1 |   | 6/2007  | Johnson et al. |
| 2011/0027007 | A1 | * | 2/2011  | Tunno et al. ...................... 403/2 |
| 2012/0104178 | A1 | * | 5/2012  | Carbone ....................... 244/213 |

* cited by examiner

*Primary Examiner* — Freddie Kirkland, III
(74) *Attorney, Agent, or Firm* — Carlson, Gaskey & Olds, PC

(57) ABSTRACT

A sensor detects relative mechanical movement between two components. The sensor has two arms, and is to be mounted on one of the two components. Each of the arms has pins received in an opening in two fuse portions. The arms are pivotal within a fuse bracket. The two fuse portions include a thin portion to allow each to fracture. The fuse portions are designed to be distinct such that a distinct amount of relative movement between the first and second arms is allowed before each of the fuse portions fracture.

11 Claims, 3 Drawing Sheets

DUAL THRESHOLD SENSOR FOR DETECTING RELATIVE MOVEMENT

BACKGROUND OF THE INVENTION

This application relates to a dual threshold sensor that can be utilized to detect relative movement between two adjacent components.

Many mechanical connections require complex movement between adjacent parts. As one example, in aircraft, slat panels are typically mounted adjacent each other for movement. There should be no relative movement in at least one dimension.

Thus, slat panels are known which include a fusible or breakable member that will fracture should there be relative movement between two panels in the axis which should have no relative movement. As an example, should two slat panel slide along a lateral direction, this would be indicative of a concern with regard to their movement. A sensor is provided which has a fuse that fractures if undue movement occurs along this axis.

An electric circuit may be applied across the sensor and when the fuse fractures, a signal will be sent to a control that there is relative movement. The control may then take corrective action.

SUMMARY OF THE INVENTION

A sensor detects relative mechanical movement between two components. The sensor has two arms, and is to be mounted on one of the two components. Each of the arms has pins received in an opening in two fuse portions. The arms are pivotal within a fuse bracket. The two fuse portions include a thin portion to allow each to fracture. The fuse portions are designed to be distinct such that a distinct amount of relative movement between the first and second arms is allowed before each of the fuse portions fracture.

These and other features may be best understood from the following drawings and specification.

DETAILED DESCRIPTION

Figure 1:
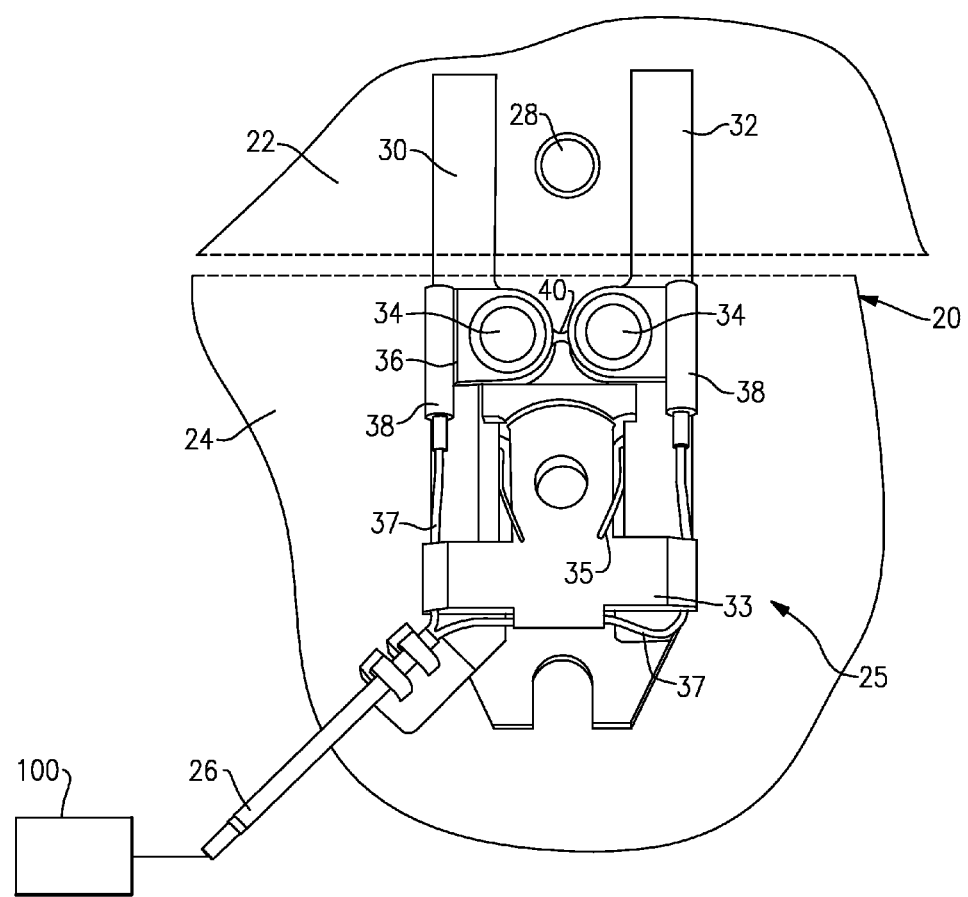
FIG. 1 schematically shows a sensor and mechanical system.

A mechanical system 20 is illustrated in FIG. 1. Two immediately adjacent mechanical components 22 and 24 should not have relative movement in at least one dimension. In one embodiment the components 22 and 24 may be slat panels for an aircraft. As known, the two are driven to move during operation of the aircraft. While the two may pivot relative to each other into and out of the plane of this paper, there should be no movement to the left or right as shown in this Figure.

Thus, a sensor 25 is provided to detect relative movement. The sensor 25 may be generally as disclosed in U.S. Pat. No. 7,921,729, and the operational features and components of the fuse disclosed in that patent are incorporated herein by reference.

Generally, a control signal from an output connection 26 is sent to a control 100 for a purpose to be described below. An electric signal is applied across a fuse 36 which may fracture. In fact, as described below, the fuse 36 will actually include two fuse portions. Arms 30 and 32 are positioned to abut panel 22 on opposed sides of a stop pin 28 which is fixed to panel 22. The sensor 25 is fixed to panel 24. Now, should there be relative movement between panels 22 and 24 (to the left or right as shown in this Figure), the stop pin 28 will contact one of the arms 30 or 32 once the movement is beyond a predetermined threshold. This will cause the arms 30 or 32 to pivot within a bracket 33. Springs 35 urge the arms 30 and 32 away from each other. However, the fuse 36 keeps the two together. As shown, electric wires 37 communicate an output connection 26 from each of two opposed ends and side barrels 38 in the fuse 36. The side barrels 38 are generally wire crimps embedded in insulation. Pins 34 extend into openings in the fuse 36. The pins 34 are fixed to the arms 30 and 32. A fusible thin portion 40 is shown between the two ends of the fuse 36.

As can be appreciated, the stop pin 28 may contact one of the arms 30 or 32 such that the contacted arm will pivot to an extent that it creates a force at the thin or weakened portion 40, then fracture may occur. At this point, the electric circuit created across the sensor 36 will no longer send a signal to output 26, and the control 100 will have an indication that there has been a fracture. The control 100 may send a signal such as to a pilot in a cockpit, or may disable further movement of panels 22 and 24.

Figure 2A:
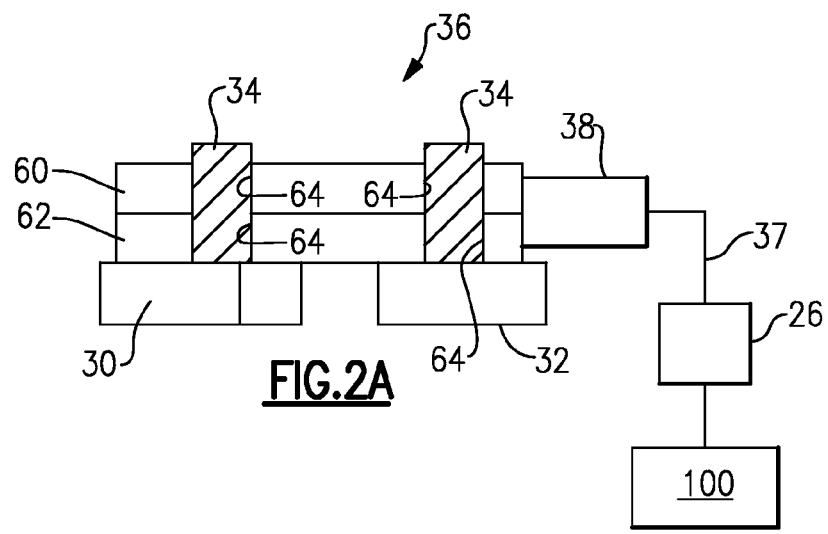
FIG. 2A shows a plan view of an inventive sensor.

The above description is consistent with the prior art in the above-mentioned patent. However, the fuse 36 of the instant application will be generally as shown in FIG. 2A. As shown, fuse 36 actually includes two fuse portions 60 and 62. The portions 60 and 62 have holes 64 each received on the pins 34. Although only one control wire is shown, separate control wires 37 substantially similar extend from each of the fuse portions 60 and 62 to the output 26.

Figure 2B:
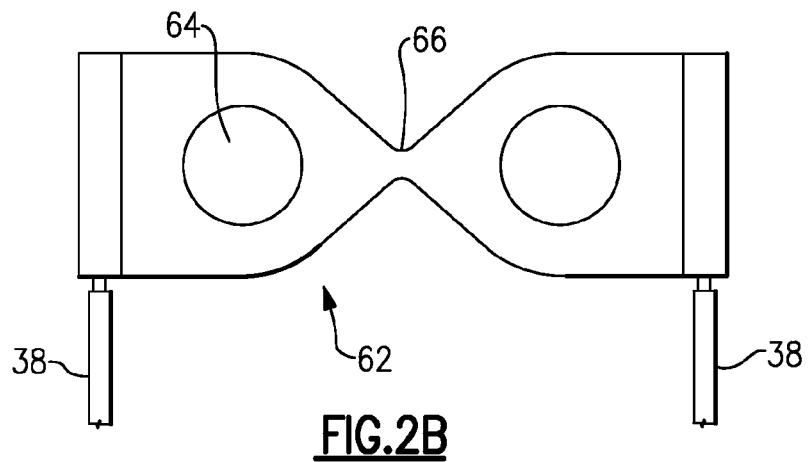
FIG. 2B shows a first fuse portion.
Figure 2C:
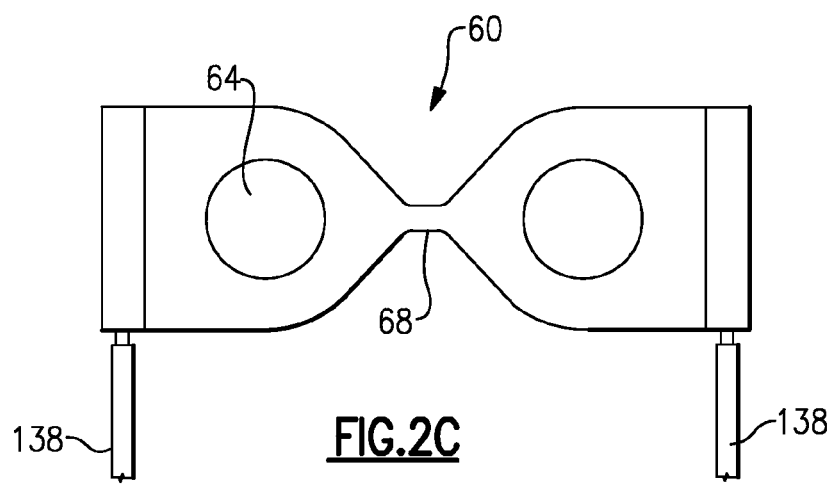
FIG. 2C shows a second fuse portion.

As shown in FIG. 2B, one of the fuse portions 62 has a thin portion 66 of a first shape. As shown in FIG. 2C, the other fuse portion 60 has a thin portion 68 which has a different shape. The shapes of the two fuse portions 60 and 62 at their thin portions 66/68 are selected such that the thin portion 66 will fracture with a first relatively small threshold of movement between the panels 22 and 24, and the portion 68 will fracture after greater movement (second threshold of movement). Thus, the output wire 37 from the first portion 62 will send a signal to the control 100 after a first threshold of movement has been passed, and the lack of a control signal from the wires 138 on the second fuse portion 60 will send the signal once there has been a greater amount of movement (second threshold of movement) and the portion 68 is fractured.

Figure 2D:
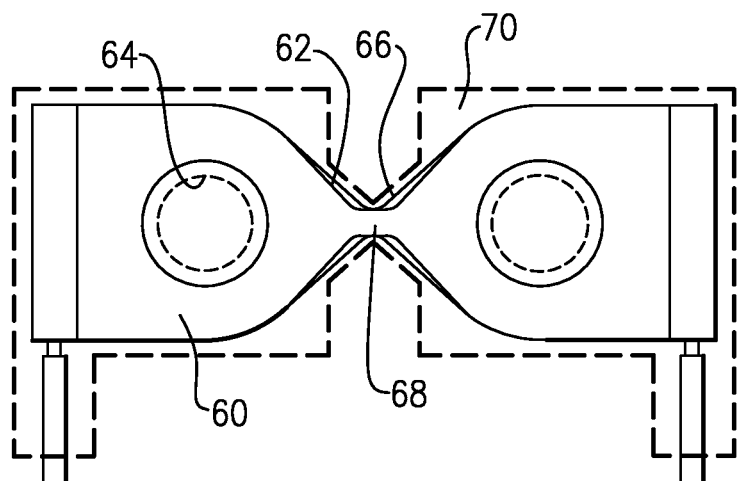
FIG. 2D shows a combination of the first and second portions.

As shown in FIG. 2D, both of the portions 60/62 may be encased in insulation 70 to protect and insulate them from each other and ground. This combination may be used as sensor 36 in FIG. 1.

Figure 3:
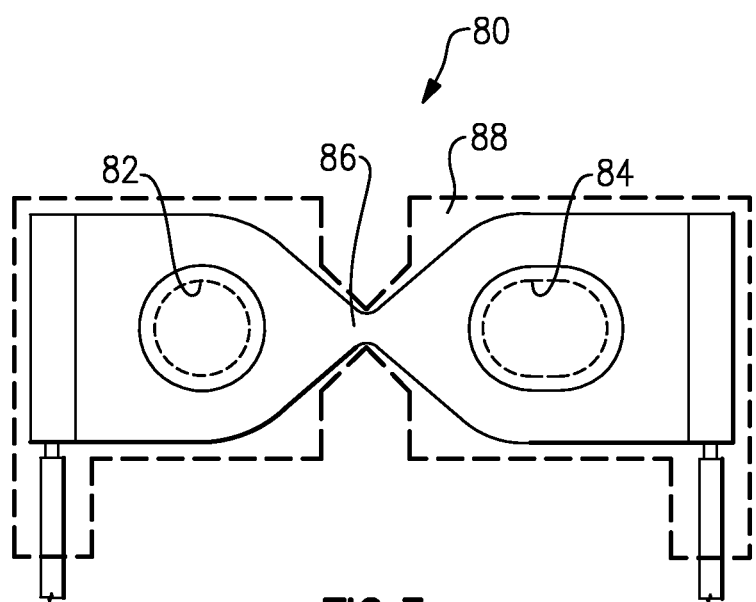
FIG. 3 shows an assembly including the FIG. 2D combination.

FIG. 3 shows another embodiment 80 wherein the thin portions 86 of the two fuse portions may be identical to each other. However, one opening 84 in one of the two fuse portions is formed to be oval. The other opening 82 is cylindrical. The other fuse portion will have two openings of a different shape, such that a different amount of movement will be allowed before fracture. In one embodiment, both of those openings may be cylindrical. Both the fuse portions will be covered in insulation 88, as in the first embodiment. Again, the two fuse portions may together be used as fuse 36 in FIG. 1.

With either embodiment, a control will now have the ability to provide more sophisticated operation over complex moving systems than in the prior art. As an example, should one threshold be reached a first corrective action may be taken, whereas when the second threshold is reached a distinct corrective action may be taken. As examples only, should the first threshold be met with the undesired relative movement between the panels 22 and 24, then the control may slow or limit further movement of the two panels. On the other hand, should the second threshold be reached, the control may stop operation of movement of the two panels 82 and 84. Of course, other corrective actions will come up in the scope of this application. Further, relative movement between components other than aircraft slats may be monitored with the disclosed sensor.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A sensor for detecting relative mechanical movement between two components comprising:
a sensor body having two arms, and said sensor body to be mounted on one of the two components;
each of said arms having pins received in an opening in two fuse portions, and said arms being pivotal within a fuse bracket, said two fuse portions each including a thin portion to allow each of said fuse portions to fracture, and each of said fuse portions designed to be distinct such that a distinct amount of relative movement between the two components can be allowed before each of said two fuse portions fracture.

2. The sensor as set forth in claim 1, wherein said thin portion on a first of said two fuse portions having a distinct shape than said thin portion on a second of said fuse portions.

3. The sensor as set forth in claim 1, wherein one of said openings that receive said pins in one of said two fuse portions has a distinct shape from at least one of the openings in a second of said fuse portions.

4. The sensor as set forth in claim 3, wherein said at least one of said openings in said one of said fuse portions has an oval shape.

5. The sensor as set forth in claim 1, wherein an electric circuit is created across each of said two fuse portions, and a signal from both circuits is sent to a control for an associated system, said control interpreting the lack of a signal from either of said two fuse portions as an indication that a threshold of mechanical movement between the two components associated with said fuse portion has occurred.

6. A mechanical system comprising:
a first component and a second component, said first and second components being such that there should be no relative movement between said two components in one dimension, one of said components including a stop pin, and the other of said two components including a sensor, the sensor including a sensor body for detecting relative mechanical movement between said two components, said sensor body having two arms, and said being mounted on the other of said two components such that relative movement between the two components in the one dimension causes said stop pin to contact one of said arms; and
each of said arms having arm pins received in an opening in two fuse portions, and said arms being pivotal within a fuse bracket, said two fuse portions each including a thin portion to allow each of said fuse portions to fracture when said stop pin contacts said one of said arms with each of said fuse portions members designed to be distinct such that a distinct amount of relative movement between said two components can be allowed before each of said two fuse portions fracture.

7. The system as set forth in claim 6, wherein said thin portion on a first of said two fuse portions having a distinct shape than said thin portion on a second of said fuse portions.

8. The system as set forth in claim 6, wherein one of said openings that receive said arm pins in one of said two fuse portions has a distinct shape from at least one of the openings in a second of said fuse portions.

9. The system as set forth in claim 8, wherein at least one of said openings in said one of said fuse portions has an oval shape.

10. The system as set forth in claim 6, wherein an electric circuit is created across each of said two fuse portions, and a signal from both circuits is sent to a control for the system, said control interpreting the lack of a signal from either of said two fuse portions as an indication that a threshold of mechanical movement between the two components has occurred.

11. The system as set forth in claim 6, wherein said two mechanical components are slat panels for an aircraft.

* * * * *

UNITED STATES PATENT AND TRADEMARK OFFICE
CERTIFICATE OF CORRECTION

| | | |
|---|---|---|
| PATENT NO. | : 8,820,174 B2 | Page 1 of 1 |
| APPLICATION NO. | : 13/683512 | |
| DATED | : September 2, 2014 | |
| INVENTOR(S) | : Michael Carbone et al. | |

It is certified that error appears in the above-identified patent and that said Letters Patent is hereby corrected as shown below:

IN THE CLAIMS:

Claim 6, column 4, line 13; prior to "being" insert --sensor body--

Signed and Sealed this
Ninth Day of June, 2015

Michelle K. Lee
*Director of the United States Patent and Trademark Office*